Dec. 30, 1958        A. GRIMAL        2,866,243

CLAMP

Filed March 23, 1955

INVENTOR.
ADOLF GRIMAL
BY
Robert A. Sloman
ATTORNEY

United States Patent Office 2,866,243
Patented Dec. 30, 1958

2,866,243

CLAMP

Adolf Grimal, Walled Lake, Mich., assignor of one-half to Leo J. Kujawa, Brighton, Mich.

Application March 23, 1955, Serial No. 496,223

1 Claim. (Cl. 24—25)

This invention relates to clamping devices, and more particularly to a clamp collar construction which consists of a strap or sleeve adapted to engage an object and having spaced apart ends, and a clamping plate adapted to grippingly engage said ends for drawing the same towards each other for securing the clamp collar upon the object or objects.

It is the object of the present invention to provide a clamp structure which may be easily made by hand and employed for immediate clamping of two or more component parts when needed.

It is the further object of the present invention to provide a clamping collar construction which incorporates a free ended strap with the ends thereof reverse turned with respect to a clamping plate having a tapered aperture for receiving the said ends of the strap and which upon relative axial sliding movement of the said plate provides for a tightening of the said clamp.

It is the further object of the present invention to provide a clamping structure for securing together a pair of telescopically connected conduits or pipes and which also includes a sliding locking plate to permit clamping and unclamping when in use.

It is the further object of the present invention to provide a locking device in conjunction with such clamping plate for securing the said clamping plate against relative longitudinal movement once it is secured in clamping position.

It is still the further object of the present invention to provide a coupling band and clamp mechanism to provide for quick connections between the pair of axially aligned conduits or pipes or similar diameter, or for closing a break in a conduit.

It is the further object of the present invention to provide a novel hose clamp construction which incorporates the use of a wedge-shaped locking plate in conjunction with the free ends of a circularly-shaped hose clamp for drawing the said ends together.

These and other objects will be seen from the following specification and claim in conjunction with the appended drawings in which:

Figure 1:
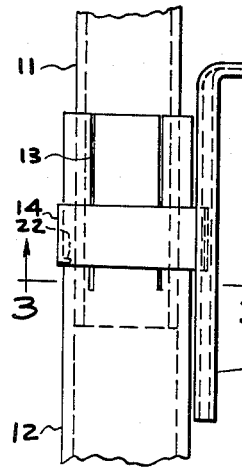
Fig. 1 is a side elevational view of a hose clamp for securing together a pair of telescopically arranged conduits which are fragmentarily shown.
Figure 2:
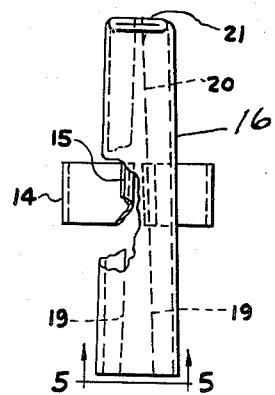
Fig. 2 is a right side elevational view thereof.

It will be understood that the above drawings illustrate merely a preferred embodiment of the invention and that other embodiments are contemplated within the scope of the claim hereafter set forth.

Referring to the drawings, Figs. 1 through 6 illustrate one form of quick clamp construction such as might be used easily for clamping and unclamping when in use, such as for tripod legs, extension aerials, pipes, or for securing gadgets or objects to pipes, and for many other purposes.

In the preferred embodiment the said clamp is shown as secured to and over a pair of telescopically related conduits 11 and 12 fragmentarily shown in Fig. 1, conduit 12 having a series of slits 13 adjacent one end to facilitate clamping of the same over the end of conduit 11.

In the clamp collar of Fig. 1, a strap or sleeve 14 has spaced apart end portions, which strap circularly extends around overlapping end portions of conduits 11 and 12 and is tightly secured thereover by means of a clamping plate.

The end portions of the strap or sleeve 14 are reverse turned and are outwardly directed as at 15 to thereby define a pair of abutment surfaces.

The clamping plate 16 has opposite elongated side edges 17 which are reverse turned to form the oppositely arranged inwardly directed lips 18 whose inner edges are diverging as at 19 axially of the clamp collar defining a tapered slot which is narrowest as at point 20 towards one end of plate 16.

The said lips 18 of plate 16 are provisioned thereunder and overlie and retainingly engage the abutment surfaces 15 formed at the free ends of strap 14. In other words, the two oppositely arranged abutment surfaces 15 are positioned within the slot defined by the lip edges 19. Accordingly, plate 16 is adapted for relative sliding movement axially of strap 14, and as the said strap approaches the reduced end portion 20 of said slot, the respective free ends of the strap are drawn towards each other for tightening the said strap over the exterior surface of conduit 12.

One end of plate 16 is formed with a right angularly related flange 21 which thus serves as means for manually sliding the clamping plate into and out of gripping relation with the said strap 14.

Figure 3:
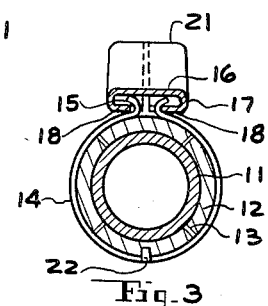
Fig. 3 is a section taken on line 3—3 of Fig. 1.

As shown in Figs. 1 and 3, an inwardly directed radial flange 22 is formed upon the interior of strap 14 intermediate its ends and is adapted to cooperatively and retainingly engage the outer conduit 12 to thereby anchor the said strap against relative longitudinal movement with respect to said conduit.

Figure 5:
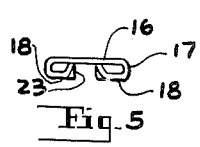
Fig. 5 is a section taken on line 5—5 of Fig. 2.
Figure 6:
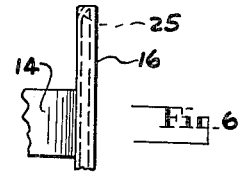
Fig. 6 is a fragmentary right end elevational view of the clamp of Fig. 4.

As shown in Fig. 5, the end of plate 16 opposite from flange 21 has the end portions of the lips 18 bent inwardly as at 23 to prevent plate 16 from becoming disengaged from strap 14.

It is contemplated as a part of the present invention, said flange 21 may be eliminated or, on the other hand, that there may be a second similar right angularly related flange at the opposite end of plate 16.

Figure 4:
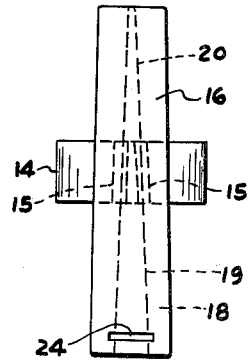
Fig. 4 is a side elevational view of a slightly different form of clamp similar to that shown in Fig. 2.

In Fig. 4 there is shown a slight variation wherein flange 21 has been eliminated. In its place there is provided adjacent one end of plate 16 a transverse slot 24 adapted to receive the free end of a screw driver blade or other article whereby the said plate may be manually slid axially of the strap 14 into tightening or loosened position. The opposite end portions of the plate corresponding to the ends of the lips 18 are slightly flattened as at 25, Fig. 6, to prevent disengagement of the said plate from strap 14.

Figure 7:
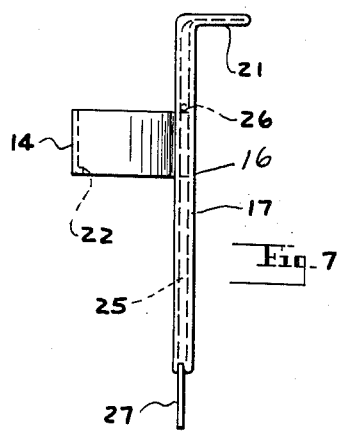
Fig. 7 is a side elevational view of clamp collar similar to that shown in Fig. 1, but including a locking wire.
Figure 8:
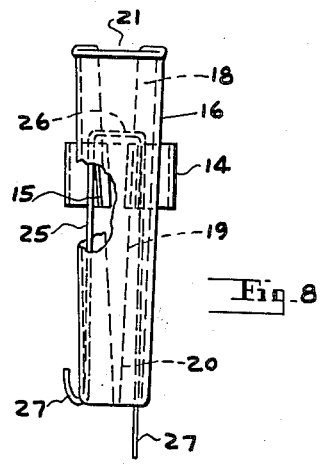
Fig. 8 is a side elevational view thereof partially broken away for illustration.
Figure 9:
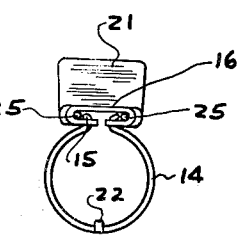
Fig. 9 is a bottom plan view of the illustration shown in Fig. 8.

A slight variation of the structure is illustrated in Figs. 7, 8 and 9, wherein the clamp strap shown is substantially the same as above described with respect to Figs. 1 through 6.

In addition, however, there has been provided a locking wire 25 which is positioned within plate 16 and between lips 18, as illustrated in Fig. 8. When the plate 16 has been axially slid so as to tightly secure the free reverse turned ends 15 of the strap with respect to a particular object such as the conduit 12 of Fig. 1, then the bight 26 of the U-shaped wire element 25 is drawn tightly against the abutment elements 15, after which the free end portions 27 of the said wire are reverse turned over the end of plate 16 as shown in Fig. 8 for effectively locking the plate against accidental axial dislodgement with respect to strap 14.

Having described my invention, referenece should now be had to the claim which follow for determining the scope thereof.

I claim:

A clamp collar comprising a split elongated ring-shaped sleeve and having spaced apart edges, and an elongated clamping plate extending at both ends beyond said sleeve grippingly receiving said edges, said plate having reverse turned opposite side edges extending inwardly to form lips directed toward each other and diverging axially of the clamp collar defining a tapered slot, the end portions of said sleeve being provided with reverse turned outwardly directed abutment surfaces retainingly engaged by said lips, the plate being axially slidable relative to said sleeve for drawing the sleeve end portions toward each other, a right angularly related flange projecting from at least one of the ends of said plate, said flange being flattened, and said slot at its narrow end terminating short of the end of the plate, the lips at the other end of said plate being bent inwardly whereby the said abutment surfaces may not be longitudinally disengaged from said plate, and a U-shaped locking wire mounted upon said plate secured compressively within and between said lips and plate and extending around said abutment surfaces, the free ends of said wire being reverse turned retainingly engaging portions of said plate.

References Cited in the file of this patent

UNITED STATES PATENTS

| | | |
|---|---|---|
| 224,397 | Crook | Feb. 10, 1880 |
| 347,150 | Beebe | Aug. 10, 1886 |
| 573,491 | Smith | Dec. 22, 1896 |
| 1,389,282 | Yingling | Aug. 30, 1921 |
| 1,630,880 | Yates | May 31, 1927 |
| 1,637,081 | Lemerond | July 26, 1927 |
| 2,027,824 | Hunt | Jan. 14, 1936 |
| 2,574,249 | Crowson et al. | Nov. 6, 1951 |

FOREIGN PATENTS

| | | |
|---|---|---|
| 374,103 | Germany | 1923 |